US010832509B1

(12) United States Patent
Read et al.

(10) Patent No.: US 10,832,509 B1
(45) Date of Patent: Nov. 10, 2020

(54) SYSTEMS AND METHODS OF A DOORBELL DEVICE INITIATING A STATE CHANGE OF AN ACCESS CONTROL DEVICE AND/OR A CONTROL PANEL RESPONSIVE TO TWO-FACTOR AUTHENTICATION

(71) Applicant: Ademco Inc., Golden Valley, MN (US)

(72) Inventors: Travis Read, Little Canada, MN (US); Andrew Covi, Golden Valley, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/422,037

(22) Filed: May 24, 2019

(51) Int. Cl.
*G05B 19/00* (2006.01)
*G07C 9/23* (2020.01)
*H04W 12/06* (2009.01)

(52) U.S. Cl.
CPC ............. *G07C 9/23* (2020.01); *H04W 12/06* (2013.01)

(58) Field of Classification Search
CPC ................................ G07C 9/23; H04W 12/06
USPC ......................................................... 340/5.61
See application file for complete search history.

(56) References Cited

U.S. PATENT DOCUMENTS

| 4,864,519 A | 9/1989 | Appleby et al. |
| 4,916,460 A | 4/1990 | Powell |
| 5,039,995 A | 8/1991 | Hulbert |
| 5,156,203 A | 10/1992 | Funakoshi et al. |
| 5,178,191 A | 1/1993 | Schaefer |
| 5,218,356 A | 6/1993 | Knapp |
| 5,224,648 A | 7/1993 | Simon et al. |
| 5,316,073 A | 5/1994 | Klaus et al. |
| 5,355,305 A | 10/1994 | Seem et al. |

(Continued)

FOREIGN PATENT DOCUMENTS

| AU | 660906 B2 | 7/1995 |
| CA | 2125694 A1 | 5/1994 |

(Continued)

OTHER PUBLICATIONS

English language translation of bibliographic data and abstract of CN103942863 (A).

(Continued)

*Primary Examiner* — Kerri L McNally
*Assistant Examiner* — Thang D Tran
(74) *Attorney, Agent, or Firm* — Fredrikson & Byron, P.A.

(57) ABSTRACT

Systems and methods of a doorbell device initiating a state change of an access control device and/or a control panel responsive to two-factor authentication are provided. Such systems and methods can include the doorbell device receiving first access credentials from a first device, determining whether the first access credentials are valid, and determining whether the first device has been authenticated with two factors by determining whether an indication of two-factor authentication of the first device has been received from the first device or by soliciting and validating second access credentials from a second device. When the first access credentials are valid and the first device has been authenticated with the two factors, the doorbell device can transmit a state change command to the access control device that controls access to a secured area associated with the doorbell device and/or the control panel that monitors the secured area.

20 Claims, 3 Drawing Sheets

(56) References Cited

U.S. PATENT DOCUMENTS

| | | |
|---|---|---|
| 5,379,455 A | 1/1995 | Koschek |
| 5,414,640 A | 5/1995 | Seem |
| 5,506,768 A | 4/1996 | Seem et al. |
| 5,550,752 A | 8/1996 | Federspiel |
| 5,555,195 A | 9/1996 | Jensen et al. |
| 5,555,196 A | 9/1996 | Asano |
| 5,568,377 A | 10/1996 | Seem et al. |
| 5,590,830 A | 1/1997 | Kettler et al. |
| 5,682,329 A | 10/1997 | Seem et al. |
| RE35,736 E | 2/1998 | Powell |
| 5,737,318 A | 4/1998 | Melnik |
| 5,762,265 A | 6/1998 | Kitamura et al. |
| 5,769,315 A | 6/1998 | Drees |
| 5,791,408 A | 8/1998 | Seem |
| 5,867,384 A | 2/1999 | Drees et al. |
| 5,960,214 A | 9/1999 | Sharpe, Jr. et al. |
| 6,006,142 A | 12/1999 | Seem et al. |
| 6,014,546 A | 1/2000 | Georges et al. |
| 6,033,302 A | 3/2000 | Ahmed et al. |
| 6,095,426 A | 8/2000 | Ahmed et al. |
| 6,122,605 A | 9/2000 | Drees et al. |
| 6,141,595 A | 10/2000 | Gloudeman et al. |
| 6,219,590 B1 | 4/2001 | Bernaden, III et al. |
| 6,219,950 B1 | 4/2001 | Hsu |
| 6,223,544 B1 | 5/2001 | Seem |
| 6,265,843 B1 | 7/2001 | West et al. |
| 6,296,193 B1 | 10/2001 | West et al. |
| 6,353,853 B1 | 3/2002 | Gravlin |
| 6,369,716 B1 | 4/2002 | Abbas et al. |
| 6,389,331 B1 | 5/2002 | Jensen et al. |
| 6,400,265 B1 | 6/2002 | Saylor et al. |
| 6,408,228 B1 | 6/2002 | Seem et al. |
| 6,415,617 B1 | 7/2002 | Seem |
| 6,437,692 B1 | 8/2002 | Petite et al. |
| 6,477,439 B1 | 11/2002 | Bernaden, III et al. |
| 6,480,889 B1 | 11/2002 | Saito et al. |
| 6,486,778 B2 | 11/2002 | Mahler et al. |
| 6,594,554 B1 | 7/2003 | Seem et al. |
| 6,759,956 B2 | 7/2004 | Menard et al. |
| 6,816,811 B2 | 11/2004 | Seem |
| 6,826,607 B1 | 11/2004 | Gelvin et al. |
| 6,829,513 B2 | 12/2004 | Piersanti et al. |
| 6,842,430 B1 | 1/2005 | Melnik |
| 6,862,540 B1 | 3/2005 | Welch et al. |
| 6,874,691 B1 | 4/2005 | Hildebrand et al. |
| 6,898,542 B2 | 5/2005 | Ott et al. |
| 6,916,239 B2 | 7/2005 | Siddaramanna et al. |
| 6,919,790 B2 | 7/2005 | Kanazawa |
| 6,937,909 B2 | 8/2005 | Seem |
| 6,959,356 B2 | 10/2005 | Packwood et al. |
| 7,010,294 B1 | 3/2006 | Pyotsia et al. |
| 7,031,880 B1 | 4/2006 | Seem et al. |
| 7,053,767 B2 | 5/2006 | Petite et al. |
| 7,053,770 B2 | 5/2006 | Ratiu et al. |
| 7,065,349 B2 | 6/2006 | Nath et al. |
| 7,085,623 B2 | 8/2006 | Siegers |
| 7,089,089 B2 | 8/2006 | Cumming et al. |
| 7,103,511 B2 | 9/2006 | Petite |
| 7,124,637 B2 | 10/2006 | Singhal et al. |
| 7,130,719 B2 | 10/2006 | Ehlers et al. |
| 7,132,757 B2 | 11/2006 | Steigerwald et al. |
| 7,148,803 B2 | 12/2006 | Bandy et al. |
| 7,170,201 B2 | 1/2007 | Hamel et al. |
| 7,176,601 B2 | 2/2007 | Tanaka et al. |
| 7,251,570 B2 | 7/2007 | Hancock et al. |
| 7,284,372 B2 | 10/2007 | Crow |
| 7,317,927 B2 | 1/2008 | Staton et al. |
| 7,321,316 B2 | 1/2008 | Hancock et al. |
| 7,349,360 B2 | 3/2008 | Gutierrez et al. |
| 7,363,031 B1 | 4/2008 | Aisa |
| 7,378,980 B2 | 5/2008 | McFarland |
| 7,379,390 B2 | 5/2008 | McFarland |
| 7,382,271 B2 | 6/2008 | McFarland |
| 7,388,886 B2 | 6/2008 | Perkins et al. |
| 7,406,300 B2 | 7/2008 | Pan |
| 7,426,452 B2 | 9/2008 | Zielinski et al. |
| 7,433,740 B2 | 10/2008 | Hesse et al. |
| 7,436,797 B2 | 10/2008 | Shepard et al. |
| 7,468,661 B2 | 12/2008 | Petite et al. |
| 7,479,727 B1 | 1/2009 | Grace |
| 7,496,472 B2 | 2/2009 | Seem |
| 7,545,267 B2 | 6/2009 | Stortoni |
| 7,554,941 B2 | 6/2009 | Ratiu et al. |
| 7,559,529 B2 | 7/2009 | Affaticati et al. |
| 7,586,888 B2 | 9/2009 | Wang |
| 7,623,826 B2 | 11/2009 | Pergal |
| 7,640,007 B2 | 12/2009 | Chen et al. |
| 7,653,010 B2 | 1/2010 | Ensor et al. |
| 7,653,394 B2 | 1/2010 | McMillin |
| 7,660,701 B2 | 2/2010 | Sharpe, Jr. |
| 7,660,892 B2 | 2/2010 | Choong et al. |
| 7,728,715 B2 | 6/2010 | Riedel et al. |
| 7,729,882 B2 | 6/2010 | Seem |
| 7,751,828 B2 | 7/2010 | Kim et al. |
| 7,752,309 B2 | 7/2010 | Keyghobad et al. |
| 7,799,560 B2 | 9/2010 | Wilson et al. |
| 7,827,813 B2 | 11/2010 | Seem |
| 7,869,805 B2 | 1/2011 | Schnaare et al. |
| 7,898,147 B2 | 3/2011 | Grabinger et al. |
| 7,908,126 B2 | 3/2011 | Bahel et al. |
| 7,970,350 B2 | 6/2011 | Sheynman et al. |
| 8,005,514 B2 | 8/2011 | Saito et al. |
| 8,027,742 B2 | 9/2011 | Seem et al. |
| 8,036,594 B2 | 10/2011 | Schadler |
| 8,049,361 B2 | 11/2011 | Kielb et al. |
| 8,255,090 B2 | 8/2012 | Frader-Thompson et al. |
| 8,281,174 B2 | 10/2012 | Seiler |
| 8,370,483 B2 | 2/2013 | Choong et al. |
| 8,459,560 B1 * | 6/2013 | Mineo-Goggin ........ G02B 5/32 |
| | | 235/487 |
| 8,665,084 B2 | 3/2014 | Shapiro et al. |
| 8,725,081 B2 | 5/2014 | Kantzes et al. |
| 8,929,948 B2 | 1/2015 | Vanderaa et al. |
| 8,933,778 B2 | 1/2015 | Birkel et al. |
| 9,008,804 B2 | 4/2015 | Junk et al. |
| 9,024,717 B2 | 5/2015 | Songakul et al. |
| 9,049,212 B2 | 6/2015 | Segre |
| 9,119,236 B1 | 8/2015 | Martin |
| 9,141,150 B2 | 9/2015 | Trundle et al. |
| 9,235,980 B2 | 1/2016 | Sharma et al. |
| 9,397,989 B1 * | 7/2016 | Ramalingam ........... H04L 63/08 |
| 9,679,453 B2 | 6/2017 | Flint et al. |
| 9,697,656 B2 | 7/2017 | Trani |
| 9,729,342 B2 | 8/2017 | Cohn et al. |
| 10,665,244 B1 * | 5/2020 | Gupta ..................... G06F 21/32 |
| 2002/0152298 A1 | 10/2002 | Kikta et al. |
| 2003/0101009 A1 | 5/2003 | Seem |
| 2003/0132829 A1 * | 7/2003 | Frolov .................... E05B 47/00 |
| | | 340/5.7 |
| 2003/0151513 A1 | 8/2003 | Herrmann et al. |
| 2003/0160693 A1 | 8/2003 | Hisano |
| 2003/0216837 A1 | 11/2003 | Reich et al. |
| 2004/0235468 A1 | 11/2004 | Luebke et al. |
| 2005/0113943 A1 | 5/2005 | Nian |
| 2005/0228509 A1 | 10/2005 | James |
| 2005/0285716 A1 | 12/2005 | Denison et al. |
| 2006/0007945 A1 | 1/2006 | Schoettle et al. |
| 2006/0063522 A1 | 3/2006 | McFarland |
| 2006/0063523 A1 | 3/2006 | McFarland |
| 2006/0104197 A1 | 5/2006 | Proctor et al. |
| 2006/0193262 A1 | 8/2006 | McSheffrey et al. |
| 2007/0097993 A1 | 5/2007 | Bojahra et al. |
| 2007/0191075 A1 | 8/2007 | Greene et al. |
| 2008/0179408 A1 | 7/2008 | Seem |
| 2008/0277486 A1 | 11/2008 | Seem et al. |
| 2008/0290986 A1 | 11/2008 | Laughlin-Parker et al. |
| 2009/0045939 A1 | 2/2009 | Holland et al. |
| 2009/0065596 A1 | 3/2009 | Seem et al. |
| 2009/0136231 A1 | 5/2009 | Lai |
| 2009/0265583 A1 | 10/2009 | Bouse et al. |
| 2009/0307255 A1 | 12/2009 | Park |
| 2010/0121968 A1 | 5/2010 | Clark |
| 2010/0283579 A1 * | 11/2010 | Kraus ................. H04L 12/2818 |
| | | 340/5.7 |

(56) References Cited

U.S. PATENT DOCUMENTS

| | | | |
|---|---|---|---|
| 2011/0195665 A1* | 8/2011 | Friedlaender | G08C 17/02 455/41.2 |
| 2012/0280790 A1 | 11/2012 | Gerhardt et al. | |
| 2014/0292481 A1* | 10/2014 | Dumas | G07C 9/00174 340/5.61 |
| 2015/0204561 A1 | 7/2015 | Sadwick et al. | |
| 2015/0227734 A1 | 8/2015 | Mucci et al. | |
| 2015/0228139 A1* | 8/2015 | Geerlings | G07C 9/00309 340/5.61 |
| 2015/0229626 A1 | 8/2015 | Hauhn | |
| 2016/0014103 A1* | 1/2016 | Masters | G07C 9/00571 340/5.61 |
| 2016/0020910 A1 | 1/2016 | Jones et al. | |
| 2016/0047565 A1 | 2/2016 | Robinson | |
| 2016/0055692 A1* | 2/2016 | Trani | G07C 9/00571 340/5.61 |
| 2016/0055698 A1* | 2/2016 | Gudmundsson | H04L 63/107 340/5.52 |
| 2016/0063853 A1 | 3/2016 | Mi | |
| 2016/0104334 A1* | 4/2016 | Handville | G07C 9/00309 340/5.61 |
| 2016/0116177 A1 | 4/2016 | Sikora et al. | |
| 2016/0171808 A1* | 6/2016 | Caterino | H04N 7/186 340/5.61 |
| 2016/0258640 A1* | 9/2016 | Grabinger | F24D 19/1084 |
| 2016/0284144 A1* | 9/2016 | Michalscheck | G05B 19/4184 |
| 2016/0352516 A1* | 12/2016 | Oberheide | H04L 9/0897 |
| 2017/0061110 A1* | 3/2017 | Wright | G07F 19/201 |
| 2017/0064261 A1* | 3/2017 | Peng | H04N 7/186 |
| 2017/0098335 A1* | 4/2017 | Payack, Jr. | G07C 9/00309 |
| 2017/0180539 A1* | 6/2017 | Payack, Jr. | H04M 1/72533 |
| 2017/0213404 A1* | 7/2017 | Sivalingam | G07C 9/257 |
| 2017/0220872 A1* | 8/2017 | Child | G06K 9/00771 |
| 2017/0331807 A1* | 11/2017 | Mont-Reynaud | H04L 63/102 |
| 2018/0007549 A1* | 1/2018 | Sanders | H04W 12/08 |
| 2018/0009416 A1* | 1/2018 | Maiwand | G07C 9/00182 |
| 2018/0075681 A1* | 3/2018 | Scalisi | G07C 9/00309 |
| 2018/0129885 A1* | 5/2018 | Potter | G08B 3/10 |
| 2018/0139332 A1* | 5/2018 | Kerzner | G08B 13/19684 |
| 2018/0260777 A1* | 9/2018 | Judge | G06Q 10/0836 |
| 2018/0293367 A1* | 10/2018 | Urman | H04L 67/12 |
| 2019/0139343 A1* | 5/2019 | Lien | G07C 9/00309 |
| 2019/0327448 A1* | 10/2019 | Fu | H04N 7/181 |
| 2019/0347916 A1* | 11/2019 | Wild | H04N 21/2747 |
| 2020/0193011 A1* | 6/2020 | Ruster | G06F 21/32 |

FOREIGN PATENT DOCUMENTS

| | | |
|---|---|---|
| CN | 1291704 A | 4/2001 |
| CN | 1804744 A | 7/2006 |
| CN | 2833675 Y | 11/2006 |
| CN | 1969239 A | 5/2007 |
| CN | 101112077 A | 1/2008 |
| CN | 101299299 A | 11/2008 |
| CN | 103942863 A | 7/2014 |
| CN | 105871874 A | 8/2016 |
| CN | 107170092 A | 9/2017 |
| DE | 69311314 T2 | 10/1997 |
| DE | 19832579 A1 | 3/1999 |
| DE | 10038233 A1 | 2/2001 |
| DE | 69808393 T2 | 6/2003 |
| DE | 102004032050 A1 | 3/2005 |
| EP | 0628181 B1 | 6/1997 |
| EP | 1072847 A2 | 1/2001 |
| EP | 0892330 B1 | 10/2002 |
| EP | 0957418 B1 | 1/2003 |
| EP | 1300771 A2 | 4/2003 |
| EP | 1309062 A2 | 5/2003 |
| EP | 2763106 A2 | 8/2014 |
| EP | 2858385 A1 | 4/2015 |
| EP | 3 445 046 A1 | 2/2019 |
| JP | 2001050599 A | 2/2001 |
| JP | 2001082786 A | 3/2001 |
| JP | 3242881 B2 | 12/2001 |
| JP | 3358661 B2 | 12/2002 |
| JP | 3370673 B2 | 1/2003 |
| JP | 2003162324 A | 6/2003 |
| JP | 2003242212 A | 8/2003 |
| JP | 2005044349 A | 2/2005 |
| SU | 535103 A1 | 11/1976 |
| WO | 9530114 A1 | 11/1995 |
| WO | 9729329 A2 | 8/1997 |
| WO | 0068744 A1 | 11/2000 |
| WO | 03023536 A1 | 3/2003 |
| WO | 2006053211 A2 | 5/2006 |
| WO | 2008127580 A2 | 10/2008 |
| WO | 2009012269 A2 | 1/2009 |
| WO | 2009012282 A2 | 1/2009 |
| WO | 2009018215 A1 | 2/2009 |
| WO | WO 2016/130777 A1 | 8/2016 |

OTHER PUBLICATIONS

English language translation of bibliographic data and abstract of CN105871874 (A).

English language translation of bibliographic data and abstract of CN107170092 (A).

American Society of Heating, Refrigerating and Air-Conditioning Engineers, Inc., "ASHRAE Addenda a,b,c,d, and g to ANSI/ASHRAE Standard 62,1—2004," 28 pages, 2006.

Bristol "On a New Measure of Interaction for Multivariable Process Control," IEEE Transactions on Automatic Control, vol. AC-11, No. 1, pp. 133-134, Jan. 1966.

Castellanos, "Nest Competitor Zstat Launches Crowdfunding for Wireless Thermostat," downloaded from http://www.bizjournals.com/boston/blog/startups/2014/01/nest-comp . . . , 2 pages, printed Sep. 12, 2014.

Castelvecchi, "Wireless Energy May Power Electronics," MIT TechTalk, vol. 51, No. 9, 8 pages, Nov. 15, 2006.

Churchill et al., "Strain Energy Harvesting for Wireless Sensor Networks," Proceedings of SPIE, vol. 5055, pp. 319-327, 2003.

Fountain et al., "Comfort Control for Short-Term Occupancy," Energy and Buildings, vol. 21, pp. 1-13, 1994.

Hosni et al., "Experimental Results for Heat Gain and Radiant/Convective Split from Equipment in Buildings," ASHRAE Transactions 1999, vol. 5, Part 2, 13 pages, 1999.

Karalis et al., "Wireless Non-Radiative Energy Transfer," 17 pages, prior to Mar. 4, 2015.

Katz, "Residential Piezoelectric Energy Sources," del, 7 pages, Jul. 21, 2004.

Kaushal et al., "Environmental Control Including Ventilation in Hospitals," JK Science, Hospital Notes, vol. 6, No. 4, pp. 229-232, Oct.-Dec. 2004.

Lawrence et al., "Adaptive Thermostat With Bluetooth Technology," ECE4007L02, Group 7, Georgia Institute of Technology, 15 pages, downloaded Apr. 27, 2015.

Lowton et al., "Finding NEMO: On the Accuracy of Inferring Location in IEEE 802.15.4 Networks," ACM, 5 pages, 2006.

Minkel, "Wireless Energy Transfer May Power Devices at a Distance," downloaded from http://www.scientificamerican.com/article/wireless-energy-transfer/, 3 pages, Nov. 14, 2006.

Ramachandran, "Establishing a Regulatory Framework for Distributed Antenna Systems," Thesis Submitted to University of Colorado, 76 pages, 2008.

Rice et al., "An Evaluation of Hospital Special-Ventilation-Room Pressures," Infection Control and Hospital Epidemiology, vol. 22, No. 1, pp. 19-23, Jan. 2001.

Thomas et al., "Feed-Forward in Temperature Control of Buildings," Energy and Buildings, vol. 37, pp. 755-761, 2005.

Extended European Search Report for corresponding EP Application No. 17188515.5, dated Jan. 18, 2018.

Canadian Office Action, for corresponding Canadian Application No. 2,977,773, dated May 3, 2019.

* cited by examiner

SYSTEMS AND METHODS OF A DOORBELL DEVICE INITIATING A STATE CHANGE OF AN ACCESS CONTROL DEVICE AND/OR A CONTROL PANEL RESPONSIVE TO TWO-FACTOR AUTHENTICATION

FIELD

The present invention relates generally to security systems and access control systems. More particularly, the present invention relates to systems and methods of a doorbell device initiating a state change of an access control device and/or a control panel responsive to two-factor authentication.

BACKGROUND

Known security systems and access control systems can receive commands and/or access credentials from a device. However, such systems do not authenticate the device, the commands, and/or the access credentials with two factors prior to taking some action responsive to the commands and/or the access credentials.

In view of the above, there is a need and an opportunity for improved systems and methods.

DETAILED DESCRIPTION

Figure 1:
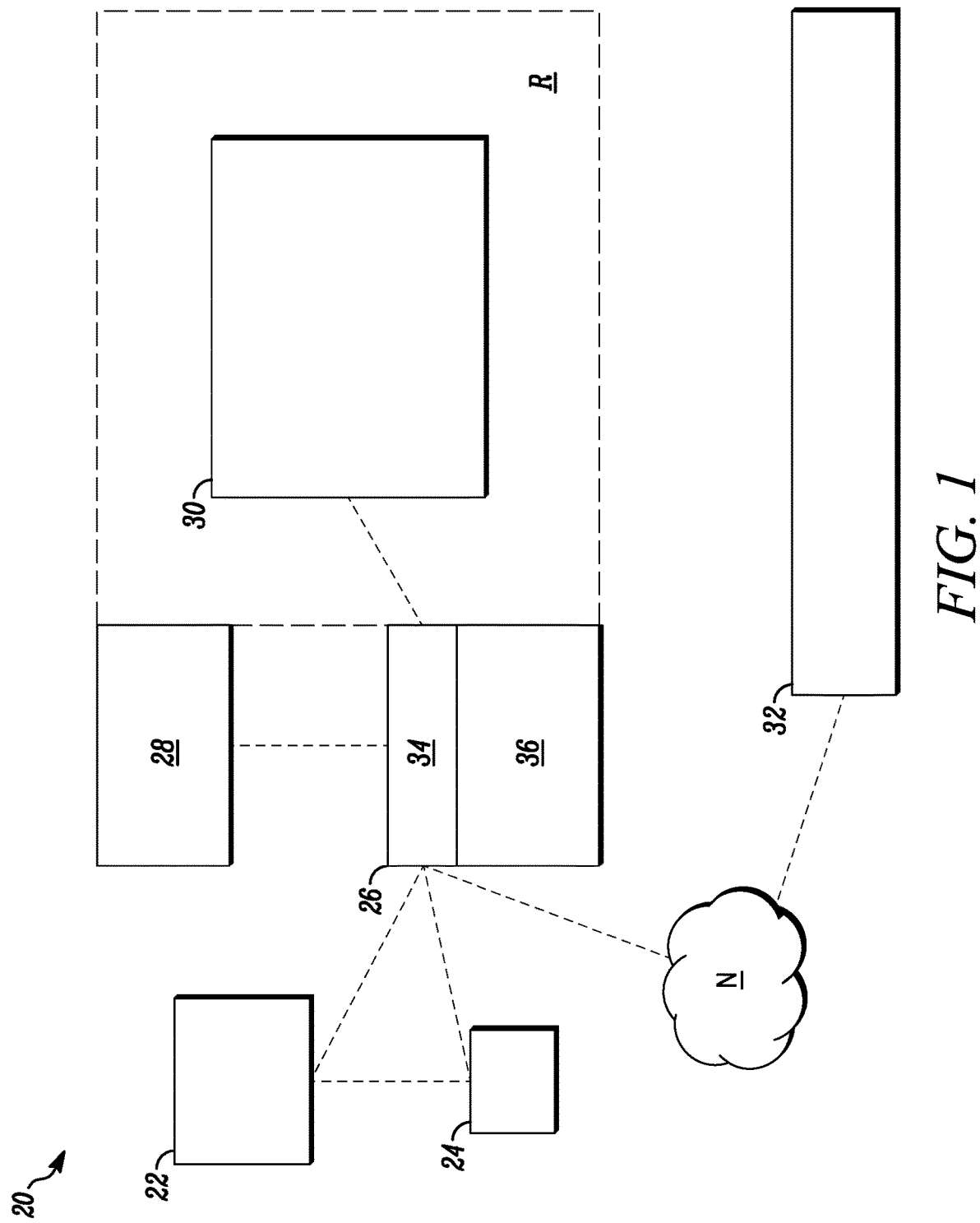
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods of a doorbell device initiating a state change of an access control device and/or a control panel responsive to two-factor authentication. For example, the doorbell device can ensure that (1) access credentials received from a first device, such as a mobile device, instructing the doorbell device to initiate the state change are valid and (2) the first device is proximate to (i.e. within a predetermined distance or a transmission range of) a second device, such as a keyfob or other two-factor authentication device, prior to initiating the state change. Such two-factor authentication can increase the likelihood that an authorized user in possession of both the first device and the second device is requesting the state change and not another person who may have stolen the first device, but is not in possession of the second device.

In some embodiments, the doorbell device can determine that the first device is proximate to the second device via communication with only the first device. However, in some embodiments, the doorbell device can determine that the first device is proximate to the second device via communication with both the first device and the second device. In any embodiment, the doorbell device can include a transceiver device for transmitting signals to and receiving signals from the first device, the second device, the access control device, the control panel, and/or a cloud server device and a programmable processor for executing the methods disclosed herein.

Various embodiments of the first device and the second device are contemplated. For example, in some embodiments, the first device can include the mobile device, such as a smart phone, a tablet, a low powered remote control device, or another portable programmable device, and in some embodiments, the second device can include the two-factor authentication device, such as the keyfob, a wireless dongle, wireless headphones, a smart watch, a wireless location beacon, another mobile device, or another low powered device that can connect to and/or pair with the first device. Alternatively, in some embodiments, the first device can include the two-factor authentication device, and the second device can include the mobile device.

As explained above, in some embodiments, the doorbell device can determine that the first device is proximate to the second device via communication with only the first device. In these embodiments, the doorbell device can receive first access credentials from the first device, determine whether the first access credentials are valid, and determine whether the doorbell device receives an indication of two-factor authentication of the first device from the first device. The indication of two-factor authentication can confirm to the doorbell device that the first device is proximate to the second device, and in some embodiments, the doorbell device can receive the first access credentials and/or the indication of two-factor authentication from the first device responsive to the first device determining that the first device is proximate to the second device. That is, in some embodiments, the first device will only transmit the first access credentials and/or the indication of two-factor authentication to the doorbell device when the first device determines that the first device is proximate to the second device.

When the first access credentials are valid and the doorbell device receives the indication of two-factor authentication, the doorbell device can transmit a state change command to the access control device, such as a lock, that controls access to a secured area associated with the doorbell device. For example, the state change command can instruct the access control device to change a state of the access control device from locked to unlocked or from unlocked to locked.

In some embodiments, the doorbell device can be located proximate to the secured area, for example, on an exterior of the secured area. Furthermore, in some embodiments, the doorbell device can include a camera device for monitoring the exterior of the secured area and/or receiving information, such as the first access credentials, from the first device. Additionally or alternatively, in some embodiments, the doorbell device can include a user interface, such as a button, that, when activated, can cause the doorbell device to notify an owner or an occupant of the secured area about a presence of a person proximate to the doorbell device, for example by emitting a sound or a tone within the secured area or transmitting an informational signal to a portable device associated with the owner.

In some embodiments, the doorbell device can transmit the state change command to the control panel in addition to or in lieu of transmitting the state change command to the access control device. For example, the state change command can instruct the control panel to change a state of the control panel from armed to disarmed or from disarmed to armed. Additionally or alternatively, in some embodiments, the doorbell device can identify a particular command to transmit to the control panel based on the state of the access control device. For example, in some embodiments, the doorbell device can identify the state of the access control device and, when the state of the access control device is unlocked, transmit an arm command to the control panel. However, when the state of the access control device is locked, the doorbell device can transmit a disarm command to the control panel.

In some embodiments, the doorbell device can receive a communication request from the first device before receiving the first access credentials from the first device. For example, responsive to receiving the communication request, the doorbell device can transmit an acknowledgement signal to the first device and, responsive thereto, receive the first access credentials.

Various embodiments for how the first device determines whether the first device is proximate to the second device are contemplated. For example, in some embodiments, the first device can determine that the first device is proximate to the second device when the second device is both paired with the first device and connected with the first device, for example, via a Bluetooth or other wireless connection. Additionally or alternatively, in some embodiments, the first device can determine that the first device is proximate to the second device when first GPS coordinates of the first device are within a predetermined range of second GPS coordinates of the second device. Additionally or alternatively, in some embodiments, the first device can determine that the first device is proximate to the second device when the first device and the second device are connected to a same local wireless network. Additionally or alternatively, in some embodiments, the first device can determine that the first device is proximate to the second device by transmitting a test command to the second device via a low powered wireless connection and, responsive thereto, receiving a response message from the second device.

Various embodiments for when the first device determines whether the first device is proximate to the second device are also contemplated. For example, in some embodiments, the first device can determine whether the first device is proximate to the second device responsive to receiving user input instructing the first device to transmit the first access credentials to the doorbell device, for example, via a user interface device of the first device, and prior to transmitting the first access credentials to the doorbell device. Additionally or alternatively, in some embodiments, the first device can determine whether the first device is proximate to the second device responsive to receiving the acknowledgement signal from the doorbell device and prior to transmitting the first access credentials to the doorbell device. Additionally or alternatively, in some embodiments, the first device can periodically determine whether the first device is proximate to the second device and, responsive thereto, adjust a display of the user interface device of the first device or what portions of the user interface device of the first device can be activated or selected. For example, when the first device determines that the first device is proximate to the second device, the first device can enable the user interface device of the first device to receive user input instructing the first device to transmit the first access credentials to the doorbell device, for example, by enabling or activating the display or portions of the user interface device of the first device. However, when the first device fails to determine that the first device is proximate to the second device, the first device can disable the user interface device of the first device from receiving user input instructing the first device to transmit the first access credentials to the doorbell device, for example, by freezing, disabling, or deactivating the display or portions of the user interface device of the first device.

In any embodiment, when the first device is proximate to the second device, the indication of two-factor authentication that the doorbell device receives from the first device can include or be representative of an authentication signal that the first device receives from the second device or another indicator confirming that the first device is proximate to the second device. In some embodiments, the doorbell device can receive both the first access credentials and the indication of two-factor authentication in a request to change the state of the access control device, and in these embodiments, the doorbell device can determine whether one or more dedicated bits in the request include the indication of two-factor authentication.

As explained above, in some embodiments, the doorbell device can determine that the first device is proximate to the second device via communication with both the first device and the second device. In these embodiments, the doorbell device can receive the first access credentials from the first device, determine whether the first access credentials are valid, and when the first access credentials are valid, transmit a notification signal to the second device to solicit second access credentials from the second device. In some embodiments, the doorbell device can transmit the notification signal to the second device via a low powered wireless connection to ensure that the second device will receive the notification signal and respond thereto only when located proximate to the doorbell device. However, in any embodiment, responsive to receiving the second access credentials from the second device, the doorbell device can determine whether the second access credentials are valid and, when the second access credentials are valid, transmit the state change command to the access control device and/or the control panel.

As explained above, the doorbell device can transmit the notification signal to the second device to solicit the second access credentials from the second device. In some embodiments, the second device can be configured to automatically transmit the second access credentials to the doorbell device responsive to receiving the notification signal. Additionally or alternatively, in some embodiments, the notification signal can instruct the second device to solicit user input identifying the second access credentials, and/or the second device can be configured to solicit user input identifying the second access credentials responsive to receiving the notification signal. Additionally or alternatively, in some embodiments, the second access credentials can be pre-stored on the second device, and the notification signal can instruct the second device to solicit user input with instructions to transmit the second access credentials, and/or the second device can be configured to solicit user input with instructions to transmit the second access credentials responsive to receiving the notification signal. In any embodiment, responsive to receiving user input identifying the second access credentials or user input with instructions to transmit the second access credentials, the second device can transmit the second access credentials to the doorbell device.

In some embodiments, when the doorbell device determines that the first access credentials received from the first device are valid, but fails to receive the indication of two-factor authentication from the first device or the second access credentials from the second device, the doorbell device can initiate a security action. In some embodiments, the security action can include the doorbell device transmitting a warning signal to a mobile device that is different than the first device or the second device or to the control panel, either of which, under certain conditions or responsive to user input, can authorize the doorbell device to transmit the state change command to the access control device or the control panel despite a lack of two-factor authentication. Additionally or alternatively, in some embodiments, the security action can include the doorbell device transmitting an alarm signal to the control panel or transmitting a locking signal to the first device, for example, when the doorbell device receives the first access credentials from the first device a predetermined number of times within a predetermined time period without also receiving the indication of two-factor authentication from the first device or the second access credentials from the second device within the predetermined period of time.

FIG. 1 is a block diagram of a system 20 in accordance with disclosed embodiments. As seen in FIG. 1, the system 20 can include a first device 22, a second device 24, a doorbell device 26 associated with a region R, an access control device 28 that controls access to the region R, and a control panel 30 that monitors the region R. In some embodiments, the system 20 can also include a cloud server device 32 that communicates with the doorbell device 26 and/or the other devices in the system 20 via a network N, such as the internet. As seen in FIG. 1, the doorbell device 26 can include a transceiver device 34 and a programmable processor 36, and in some embodiments, the transceiver device 34 can include one or more communication modules for communicating with the first device 22, the second device 24, the access control device 28, the control panel 30 and/or the cloud server device 32 via any known wireless or wired communication medium (e.g. Wi-Fi, cellular, Bluetooth, cable, phone line, Ethernet, fiber, etc.).

Figure 2:
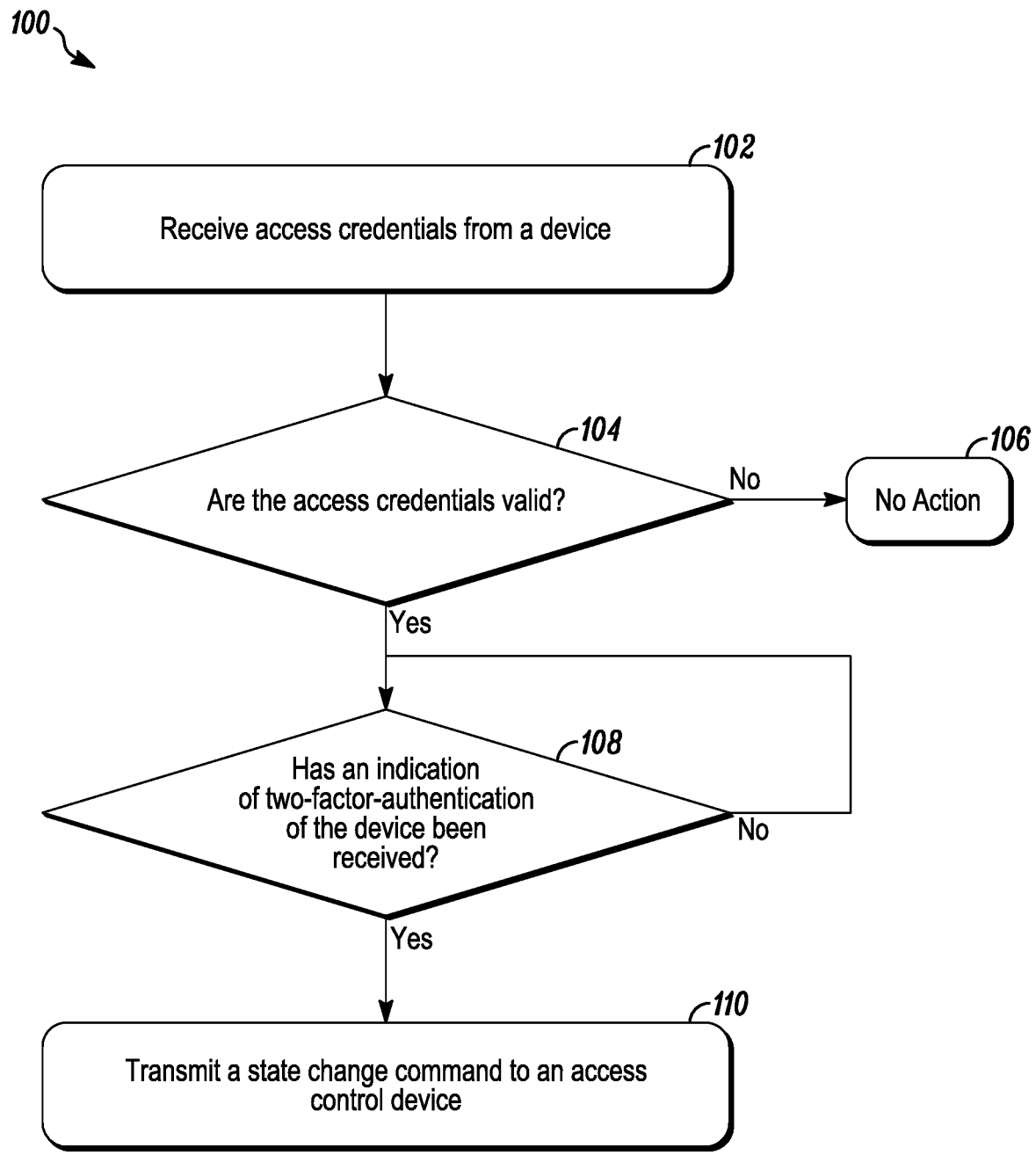
FIG. 2 is a flow diagram of a method in accordance with disclosed embodiments.

FIG. 2 is a flow diagram of a method 100 in accordance with disclosed embodiments. As seen in FIG. 2, the method 100 can include the transceiver device 34 receiving first access credentials from the first device 22, as in 102. Then, the method 100 can include the programmable processor 36 determining whether the first access credentials are valid, as in 104. When the first access credentials are invalid, the method 100 can include taking no action, as in 106, or, in some embodiments, initiating a security action as described herein.

However, when the first access credentials are valid, the method 100 can include the programmable processor 36 determining whether the doorbell device 26 has received an indication of two-factor authentication of the first device 22 from the first device 22, as in 108. If not, then the method 100 can continue determining whether the indication of two-factor authentication has been received, as in 108. However, when the indication of two-factor authentication has been received, the method 100 can include the transceiver device 34 transmitting a state change command to the access control device 28 and/or the control panel 30, as in 110.

Figure 3:
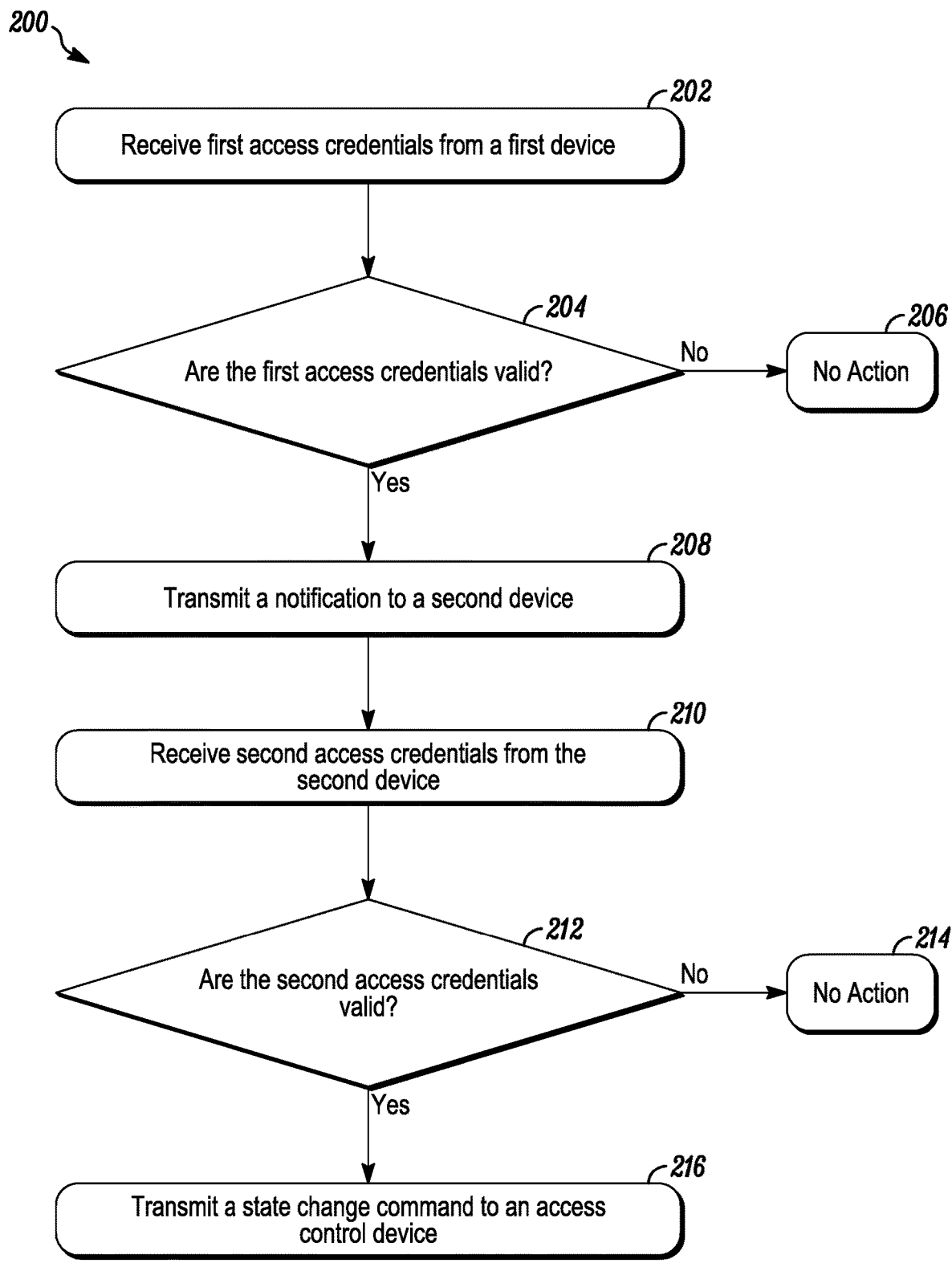
FIG. 3 is a flow diagram of a method in accordance with disclosed embodiments.

FIG. 3 is a flow diagram of a method 200 in accordance with disclosed embodiments. As seen in FIG. 3, the method 200 can include the transceiver device 34 receiving first access credentials from the first device 22, as in 202. Then, the method 200 can include the programmable processor 36 determining whether the first access credentials are valid, as in 204. When the first access credentials are invalid, the method 200 can include taking no action, as in 206, or, in some embodiments, initiating a security action as described herein.

However, when the first access credentials are valid, the method 200 can include the transceiver device 34 transmitting a notification signal to the second device 24, as in 208, and responsive thereto, receiving second access credentials from the second device 24, as in 210. Then, the method 200 can include the programmable processor 36 determining whether the second access credentials are valid, as in 212. When the second access credentials are invalid, the method 200 can include taking no action, as in 214, or, in some embodiments, initiating the security action as described herein. However, when the second access credentials are valid, the method 200 can include the transceiver device 34 transmitting a state change command to the access control device 28 and/or the control panel 30, as in 216.

Various embodiments for transmitting the first access credentials and the second access credentials are contemplated. For example, in some embodiments, the first device 22 can transmit the first access credentials directly to doorbell device 26 and/or the second device 24 can transmit the second access credentials directly to the doorbell device 26 via any known communication medium, including, but not limited to Bluetooth, radio frequency ID, near field communication, WiFi, and cellular, or via a visual display of coded information, such as a QR code or a barcode, that is captured by a camera of the doorbell device 26. Additionally or alternatively, in some embodiments, the first device 22 can transmit the first access credentials indirectly to doorbell device 26 and/or the second device 24 can transmit the second access credentials indirectly to the doorbell device 26 via an intermediary device, such as the cloud server device 32 or the control panel 30.

Various embodiments for determining whether the first access credentials and/or the second access credentials are valid are also contemplated. For example, in some embodiments, the programmable processor 36 can determine whether the first access credentials and/or the second access credentials are valid. Additionally or alternatively, in some embodiments, the doorbell device 26 can communicate with one or both of the control panel 30 and the cloud server device 32 to determine whether the first access credentials and/or the second access credentials are valid. It is to be understood that determining whether any access credentials are valid as described herein can include determining whether those access credentials are associated with the doorbell device 26, the access control device 28, the control panel 30, the region R, and/or an authorized user associated with the doorbell device 26, the access control device 28, the control panel 30, or the region R.

Finally, various embodiments for transmitting the state change command to the access control device 28 and/or the control panel 30 are contemplated. For example, in some embodiments, the doorbell device 26 can transmit the state change command directly to the access control device 28 and/or the control panel 30. Additionally or alternatively, in some embodiments, the doorbell device 26 can transmit the state change command to the access control device 28 via an intermediary device, such as the cloud server device 32 or the control panel 30, or can transmit the state change command to the control panel 30 via an intermediary device, such as the cloud server device 32.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without depart-

What is claimed is:

1. A method comprising:
receiving access credentials at a doorbell device from a mobile device;
determining whether the access credentials are valid at t doorbell device;
determining whether the doorbell device receives an indication of a two-factor authentication of the mobile device from the mobile device, wherein the indication of the two-factor authentication of the mobile device confirms to the doorbell device that the mobile device has communicated with a two-factor authentication device to execute the two-factor authentication of the mobile device without the doorbell device communicating directly with the two-factor authentication device; and
when the access credentials are valid and the doorbell device receives the indication of the two-factor authentication of the mobile device from the mobile device, transmitting a state change command from the doorbell device to an access control device that controls access to a secured area associated with the doorbell device.

2. The method of claim 1 further comprising:
determining a state of the access control device;
when the access credentials are valid, the doorbell device receives the indication of the two-factor authentication of the mobile device from the mobile device, and the state of the access control device is unlocked, transmitting an arm command from the doorbell device to a control panel that monitors the secured area; and
when the access credentials are valid, the doorbell device receives the indication of the two-factor authentication of the mobile device from the mobile device, and the state of the access control device is locked, transmitting a disarm command from the doorbell device to the control panel.

3. The method of claim 1 further comprising:
receiving a communication request at the doorbell device from the mobile device;
responsive to receiving the communication request, transmitting an acknowledgment signal from the doorbell device to the mobile device; and
responsive to the acknowledgment signal, receiving the access credentials at the doorbell device.

4. The method of claim 1 wherein the indication of the two-factor authentication of the mobile device confirms to the doorbell device that the mobile device is proximate to the two-factor authentication device.

5. The method of claim 1, wherein the indication of the two-factor authentication of the mobile device confirms to the doorbell device that the two-factor authentication device is both paired with the mobile device and connected with the mobile device.

6. The method of claim 1 wherein the indication of the two-factor authentication of the mobile device confirms to the doorbell device that first GPS coordinates of the mobile device are within a predetermined range of second GPS coordinates of the two-factor authentication device.

7. The method of claim 1 further comprising:
receiving both the access credentials and the indication of the two-factor authentication of the mobile device at the doorbell device in a request to change a state of the access control device.

8. The method of claim 7 further comprising:
determining whether one or more dedicated bits of the request include the indication of the two-factor authentication of the mobile device.

9. A doorbell device comprising:
a transceiver device; and
a programmable processor,
wherein the transceiver device receives access credentials from a first device,
wherein the programmable processor determines whether the access credentials are valid,
wherein the programmable processor determines whether the transceiver device has received an indication of a two-factor authentication of the first device from the first device,
wherein the indication of the two-factor authentication of the first device confirms to the programmable processor that the first device has communicated with a second device to execute the two-factor authentication of the first device without the transceiver device communicating directly with the second device, and
wherein, when the access credentials are valid and the transceiver device has received the indication of the two-factor authentication of the first device from the first device, the transceiver device transmits a state change command to an access control device that controls access to a secured area associated with the doorbell device.

10. The doorbell device of claim 9 wherein the transceiver device receives a communication request from the first device, transmits an acknowledgement signal to the first device responsive to receiving the communication request, and receives the access credentials responsive to the acknowledgement signal.

11. The doorbell device of claim 9 wherein the transceiver device receives both the access credentials and the indication of the two-factor authentication of the first device in a request to change a state of the access control device.

12. The doorbell device of claim 11 wherein the programmable processor determines whether one or more dedicated bits of the request include the indication of the two-factor authentication of the first device.

13. The doorbell device of claim 9 wherein the indication of the two-factor authentication of the first device confirms to the programmable processor that the first device is proximate to the second device.

14. The doorbell device of claim 9 wherein the programmable processor determines a state of the access control device, wherein, when the access credentials are valid, the transceiver device receives the indication of the two-factor authentication of the first device from the first device, and the state of the access control device is, unlocked, the transceiver device transmits an arm command to a control panel that monitors the secured area, and wherein, when the access credentials are valid, the transceiver device receives the indication of die two-factor authentication of the first device from the first device, and the state of the access control device is locked, the transceiver device transmits a disarm command to the control panel.

15. The doorbell device of claim 9 wherein the indication of the two-factor authentication of the first device confirms to the programmable processor that the second device is both paired with the first device and connected with the first device.

16. The doorbell device of claim 9 wherein the indication of the two-factor authentication of the first device confirms to the programmable processor that first GPS coordinates of the first device are within a predetermined range of second GPS coordinates of the second device.

17. A method comprising:
receiving access credentials at a doorbell device from a mobile device;
determining whether the access credentials are valid at the doorbell device;
determining whether the doorbell device receives an indication of a two-factor authentication of the mobile device from the mobile device, wherein the indication of the two-factor authentication of the mobile device confirms to the doorbell device that the mobile device has confirmed that the mobile device is proximate to a two-factor authentication device without the doorbell device communicating directly with the two-factor authentication device; and
when the access credentials are valid and the doorbell device receives the indication of the two-factor authentication of the mobile device, transmitting a state change command from the doorbell device to an access control device that controls access to a secured area associated with the doorbell device.

18. The method of claim 17 wherein the indication of the two-factor authentication of the mobile device confirms to the doorbell device that the mobile device has communicated with the two-factor authentication device to confirm that the mobile device is proximate to the two-factor authentication device.

19. The method of claim 17 wherein the indication of the two-factor authentication of the mobile device confirms to the doorbell device that the mobile device has confirmed that the two-factor authentication device is both paired with the mobile device and connected with the mobile device.

20. The method of claim 17 wherein the indication of the two-factor authentication of the mobile device confirms to the doorbell device that the mobile device has communicated with the two-factor authentication device to confirm that first GPS coordinates of the mobile device are within a predetermined range of second GPS coordinates of the two-factor authentication device.

* * * * *